Nov. 17, 1953 R. T. CASEY 2,659,783
ELECTRIC CIRCUIT BREAKER
Filed July 17, 1951 5 Sheets-Sheet 1
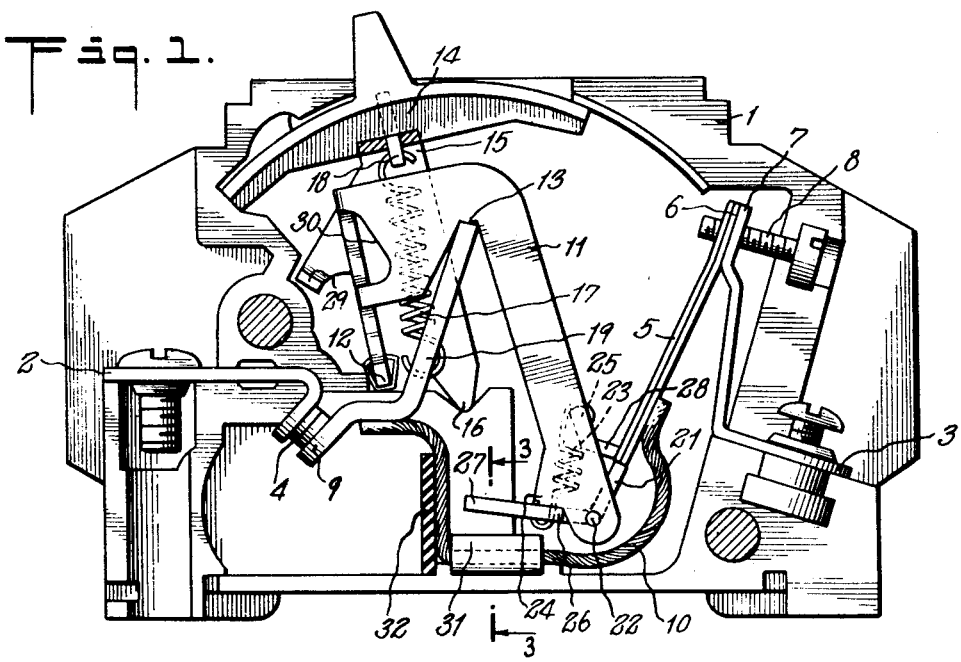
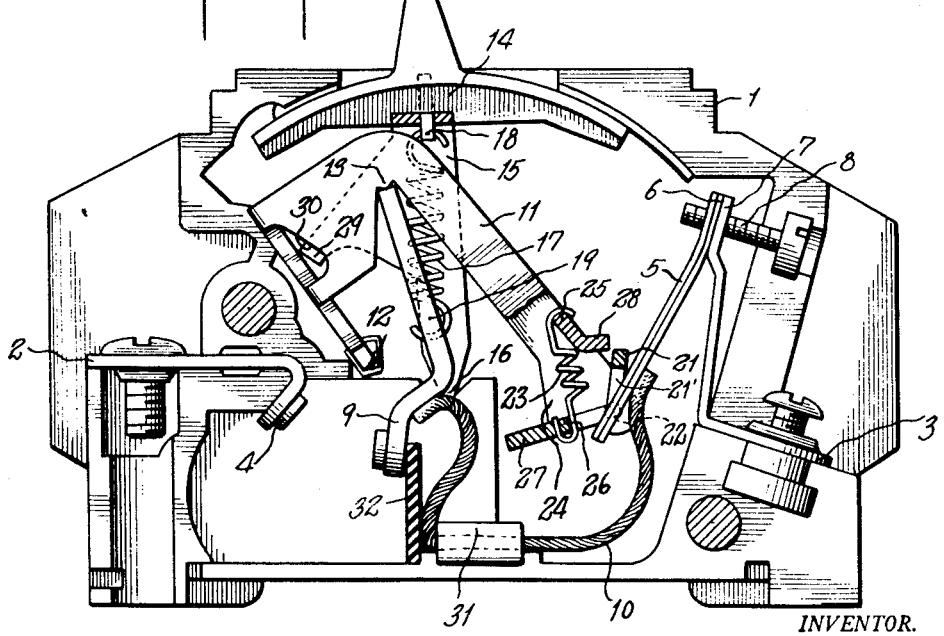
INVENTOR.
ROBERT T. CASEY
BY
ATTORNEY

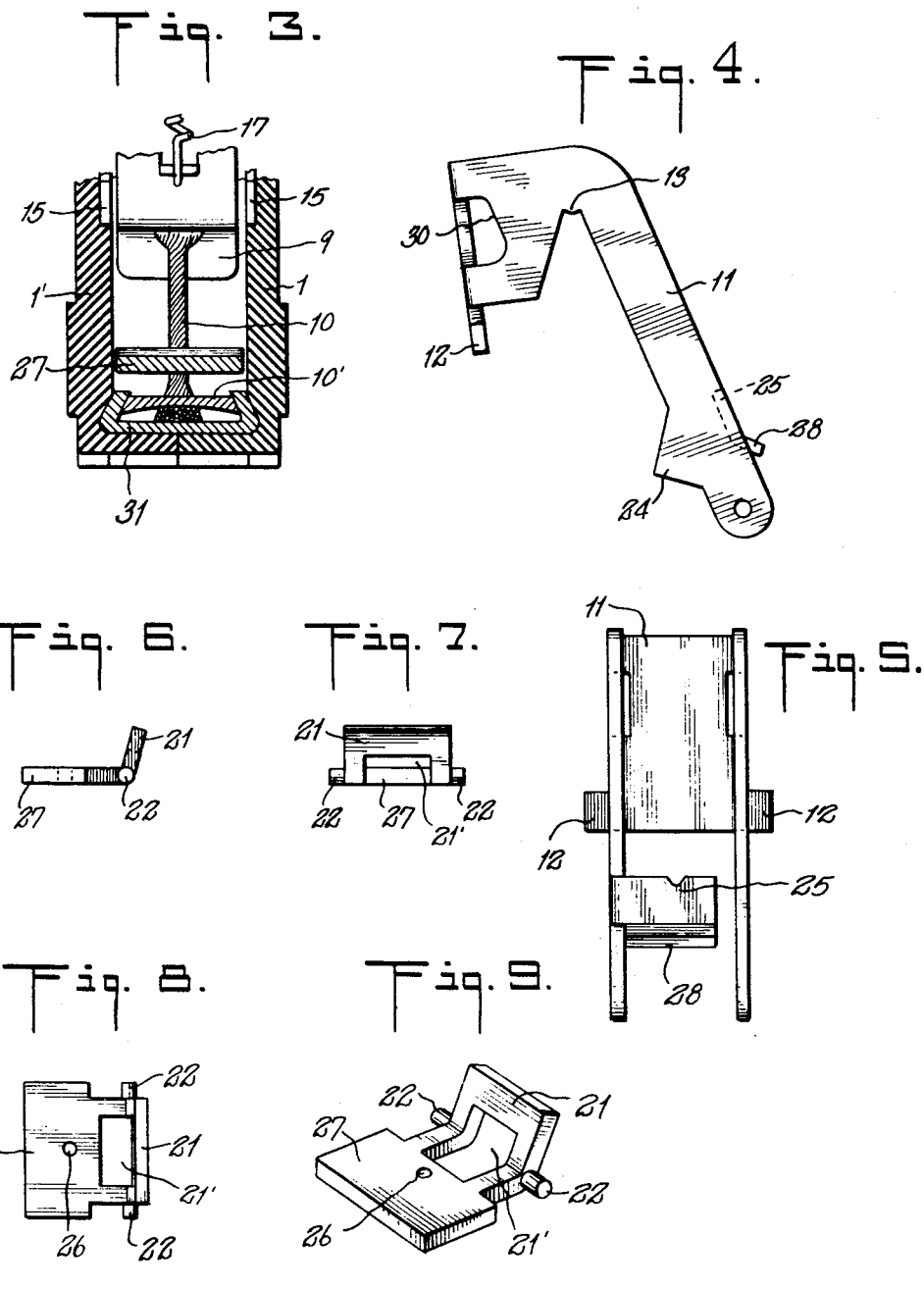

Nov. 17, 1953     R. T. CASEY     2,659,783
ELECTRIC CIRCUIT BREAKER
Filed July 17, 1951     5 Sheets-Sheet 3
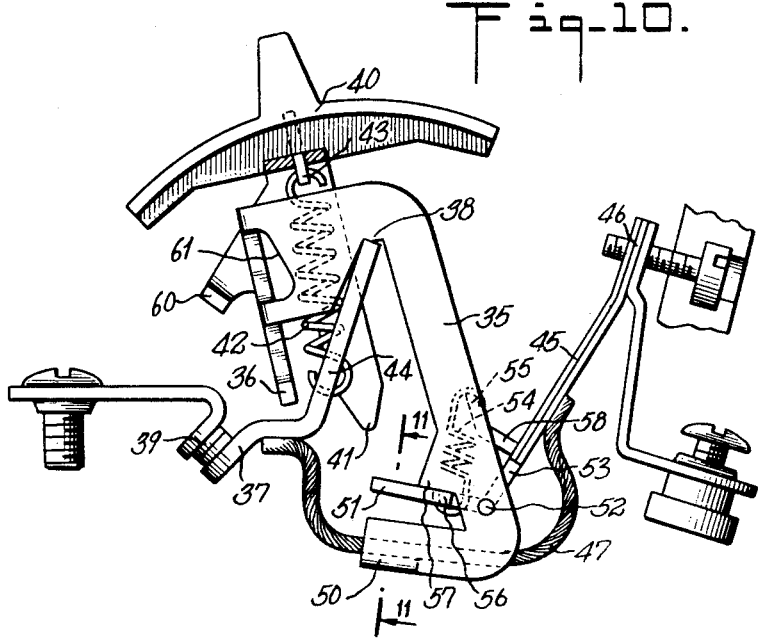
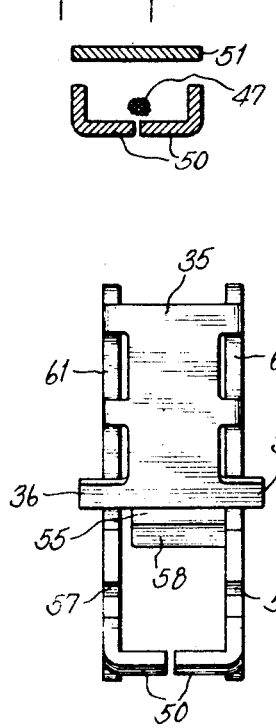
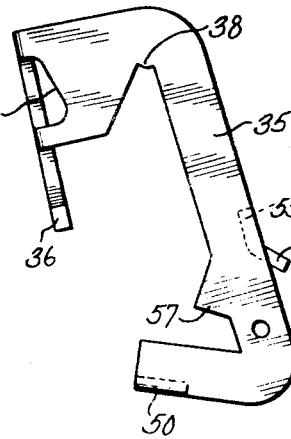
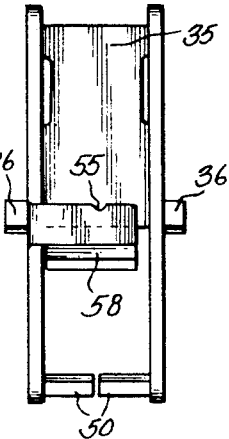
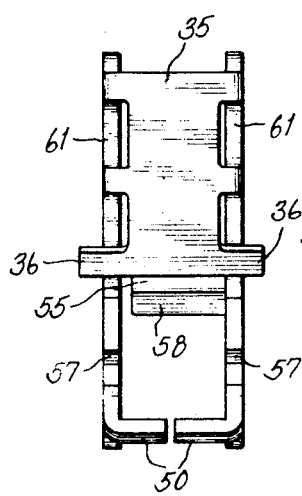
INVENTOR.
ROBERT T. CASEY
BY
ATTORNEY

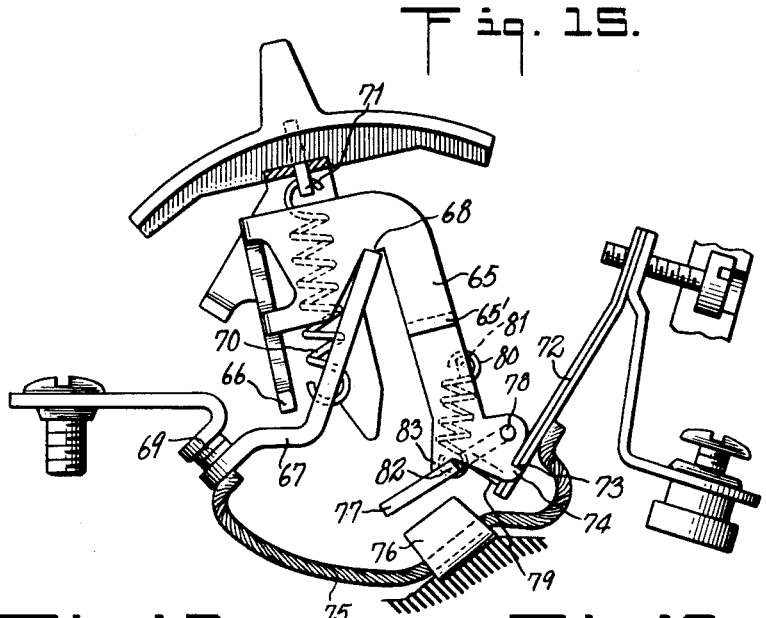
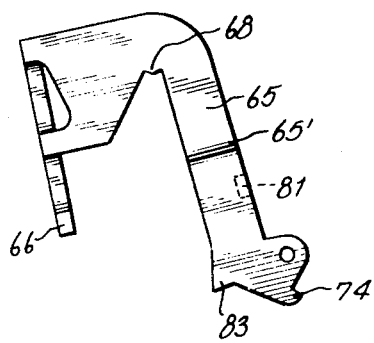
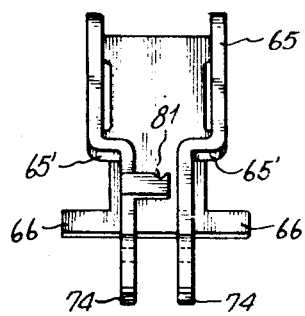
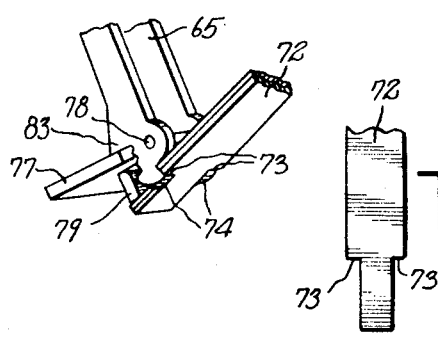

Nov. 17, 1953  R. T. CASEY  2,659,783
ELECTRIC CIRCUIT BREAKER
Filed July 17, 1951  5 Sheets-Sheet 5

INVENTOR.
ROBERT T. CASEY
BY
ATTORNEY

Patented Nov. 17, 1953

2,659,783

UNITED STATES PATENT OFFICE 2,659,783

ELECTRIC CIRCUIT BREAKER

Robert T. Casey, Bristol, Conn., assignor to General Electric Company, a corporation of New York Application July 17, 1951, Serial No. 237,256

5 Claims. (Cl. 200—88)

It is an object of my invention to provide automatic releasing means for circuit breakers which will operate both thermally and magnetically, and which is simple and economical in construction, is easily assembled, and is dependable in operation.

Another object is to provide releasing means for circuit breakers having a thermally responsive member and a separate magnetically responsive member which coact with each other but which retain their respective original calibrations at all times.

Another object is to provide for use in circuit breakers, separate magnetic and thermal tripping means movable in relatively opposite directions to cause tripping, in such a way that the speed of releasing on high overloads is proportionate to the sum of the speeds of movement of the magnetic and thermal means.

Another object is to provide a combination thermal and magnetic tripping means for circuit breakers in which the deflection of the thermal element will not be limited by the magnetic element.

Another object is to provide magnetic tripping means for circuit breakers which will be actuated by a magnetic field but will not operate to cause opening of the circuit breaker until the magnetic field is reduced.

Another object is to provide magnetic tripping means for alternating current circuit breakers which will tend to cause opening of the breaker contacts at a point in the A.-C. cycle at or near the current-zero point.

Fig. 1 is a face view of mechanism embodying one form of my invention, the parts being shown in the closed circuit position.

Fig. 2 is a similar view of the mechanism of Fig. 1 shown in the automatic tripped position.

Fig. 3 is a vertical sectional view taken on the general plane of the line 3—3 of Fig. 1.

Fig. 4 is a side view of the cradle or tripping member.

Fig. 5 is an edge view of the cradle of Fig. 4.

Fig. 6 is an edge view of the armature of the magnetic release device.

Fig. 7 is a side view of the same.

Fig. 8 is a plan view of the same.

Fig. 9 is a perspective view of the same.

Fig. 10 is a face view of a modified form of mechanism, parts being shown in closed circuit position.

Fig. 11 is a fragmentary sectional view on the plane of the line 11—11 of Fig. 10.

Fig. 12 is a face view of the cradle or tripping member of the form shown in Fig. 10.

Fig. 13 is an edge view of the device of Fig. 12.

Fig. 14 is a view similar to Fig. 13 but looking at the cradle from the opposite side.

Fig. 15 is a face view of another modified form of mechanism involving my invention, the parts being shown in the closed circuit position.

Fig. 16 is a face view of the cradle or tripping member of the form shown in Fig. 15.

Fig. 17 is an edge view of the same.

Fig. 18 is a fragmentary perspective view showing the connection between the bimetal member, the tripping or cradle member and the arm of the magnetic release device of Fig. 15.

Fig. 19 is a perspective view of the armature member of the magnetic device of Fig. 15.

Fig. 20 is a detail view of the end of the bimetal member.

Figure 21:
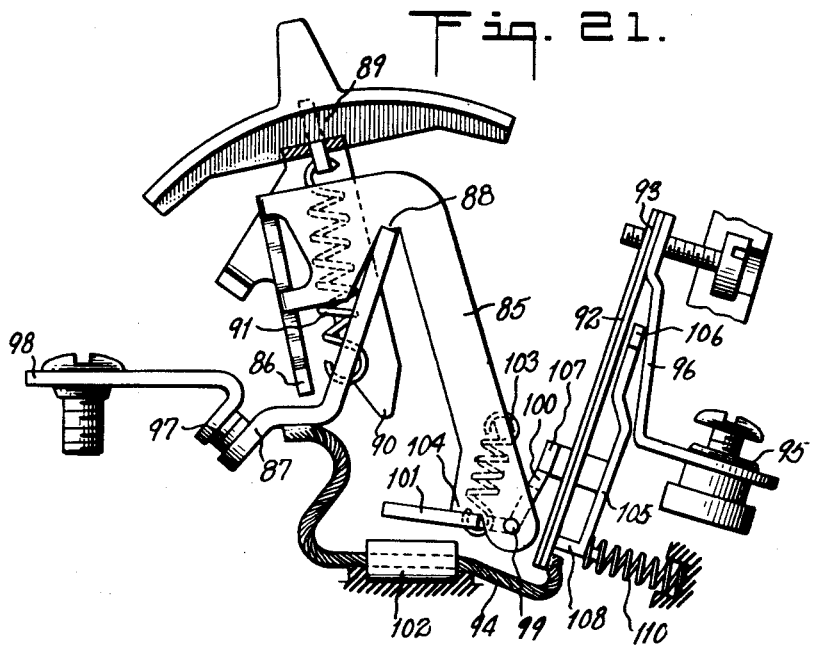
Fig. 21 is a face view showing a modified form of mechanism embodying my invention, the parts being shown in the closed circuit position.
Figure 22:
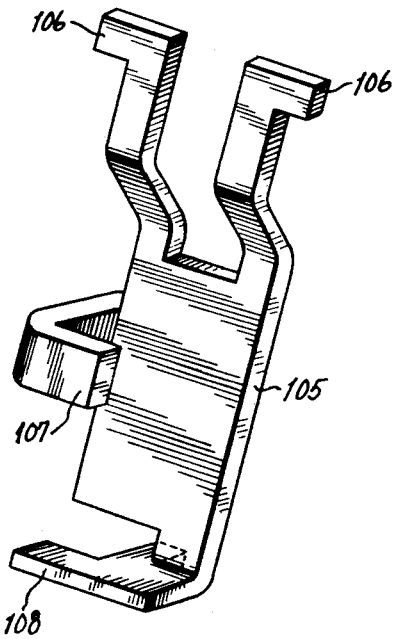
Fig. 22 is a perspective view of the latching member of Fig. 21, on an enlarged scale.

It will be understood that the mechanism will be enclosed in a suitable housing preferably formed of insulating material and consisting of two equal parts, part 1 and part 1'. Each part contains holes, guide ridges, grooves, etc. for supporting and guiding the mechanism and each part is substantially the mirror image of the other.

The circuit terminals 2 and 3 are suitably supported in the housing. Stationary contact 4 is connected to the terminal 2. A bimetal strip 5 is secured at 6 to a bracket 7 which extends inwardly from the terminal 3. A calibrating screw 8 is suitably mounted in the housing. A movable switch member 9 is connected by a flexible lead 10 to the movable part of the bimetal strip. A cradle or trip member 11 is hinged at 12 in the housing and provides a bearing 13 for the switch member 9.

A manually operable member 14 is secured to the outer end of a lever 15 which is hinged in a groove 16 in the inner wall of the housing. A spring 17 is connected at 18 to the actuating lever 15 and connected at its lower end to the switch arm 9 at 19.

To open the circuit manually from the closed position of Fig. 1, the actuating or finger piece 14 is moved to the right so that the upper end of the spring 17 is carried to the right of the hinge 13 whereupon the switch member snaps quickly from closed to open circuit position.

Normally the cradle or trip arm 11 is held in the position of Fig. 1 by latching means cooperating between the bimetal member 5 and the long arm of the cradle. A latching member 21 is hinged or pivotally mounted at 22 on the lower end of the cradle or tripping arm 11 and is normally drawn by the spring 23 against the abutment 24, the spring being hooked over the edge 25 and connected at 26 to the armature member 27.

In case of a prolonged relatively light overload current, the bimetal strip 5 warps to the right as viewed in Fig. 1 until the latch 21 is disconnected from the bimetal whereupon the tension of the spring 17 draws the switch member 9 to the right and tilts the tripping arm 11 from the position of Fig. 1 to the position of Fig. 2. The lug 28 carried by the tripping arm serves to limit the movement of the bimetal strip.

It will be observed that as shown in Figs. 6–9, latch 21 has a centrally located opening 21' of width slightly greater than the width of the end of the bimetal strip 5. This permits the pivot point 22 to be in direct line with the bimetal 5, as in Fig. 1, without interfering with the tripping action as shown in Fig. 2.

To reset the breaker from an automatic release as above described, it is merely necessary to move the finger piece of the actuating member to the right whereupon the lug 29 on the actuating member engages the edge 30 on the cradle. Continued movement of the finger piece to the right tilts the cradle back to the position of Fig. 1 during which movement the lug 21 slides upon the bimetal strip until it engages the tip of the bimetal strip (see Fig. 1). The circuit may then be closed in the usual manner.

In order to break the circuit in case of a heavy sudden overload current, I provide magnetic means including a magnetic pole piece 31 which has an armature 27, previously described as a part of the latching mechanism. In case of a heavy overload, the armature is attracted and drawn down from the position of Fig. 1 and thereby the member 21 is retracted from the end of the bimetal strip 5 leaving the spring 17 free to throw the cradle into the position of Fig. 2. As above described, the switch arm 9 is drawn from the closed to the open circuit position where the switch arm 9 abuts against a stop 32.

It will be noted that in the automatic opening of the circuit due to a prolonged relatively light overload, the tripping member is released by the movement of the bimetal strip to the right in Fig. 1, and in case of a sudden heavy overload the release is brought about by attraction of the armature 27 which tilts the lug 21 to the left so that the trip arm is free to turn about the pivot 12.

The cord or braid 10 may be held in place between the pole pieces by a clamp plate 10' which should be formed of non-magnetic material.

On Sheet 3 of the drawings, I have shown mechanism embodying a modified form of my invention, in which the tripping cradle 35 is hinged at 36. The switch member 37 is hinged at 38 to the cradle and coacts with the stationary contact 39. The actuating member 40 is pivoted at 41. A throwing spring 42 connects the actuating member at 43 to the switch member 37 at 44. The bimetal strip 45 is fixed at 46 and is connected by a flexible conductor 47 to the switch member 37. The magnet in this case has a portion 50 which is integral with the lower end of the tripping arm. The armature 51 is pivoted at 52 and has a projection 53 which normally abuts against the end of the bimetal member 45. A spring 54 is connected to a bridge piece 55 at its upper end and at its lower end the spring is connected to the armature at 56. The spring normally draws the armature against the abutment 57. The lug 58 serves to limit the movement of the bimetal strip.

In case of a moderate overload, the bimetal strip warps toward the right as viewed in Fig. 10 which disconnects it from the latching projection 53, thus permitting the tripping lever to swing anti-clockwise about its pivot 36. As the pivot point 38 passes the line of tension of the spring 42, the switch member 37 is thrown to the open circuit position.

In case of a sudden heavy overload in the circuit, the armature 51 is drawn toward the field piece 50 of the magnet so that the latching member 53 is disengaged from the bimetal strip 45 so that the tripping member is free to operate and open the circuit as just described.

To reset the switch member after an automatic release, the finger piece is moved to the right as viewed in Fig. 10 whereupon the lug 60 on the actuating lever engages the edge 61 of the cradle and tilts the cradle clockwise about its pivot 36. The end of abutment 53 is then drawn down along the side of the bimetal strip 45 until the latch member 53 snaps beneath the end of the bimetal strip whereupon the switch is in open circuit position and free to be actuated in the usual manner.

In the form of mechanism shown on Sheet 4, the tripping member or cradle 65 is pivoted at 66. The switch member 67 is hinged at 68 to the cradle and coacts in the usual manner with the stationary contact 69. Spring 70 connects the switch member to the actuating member at 71. The bimetal strip 72 is supported as previously described and has shoulders 73 which normally stand in the path of movement of the latch members 74 on the opposite sides of the tripping member or cradle 65. A flexible conductor 75 lies between the sides of the field piece 76 and connects the bimetal strip with the movable contact. The armature 77 is pivoted at 78 in the end of the cradle and has a tongue 79. A spring 80 connects a lug 81 on the cradle with the armature at 82, and draws the armature against the stop 83. The magnet armature has a central lanced out portion which forms the tongue 79.

In case of a heavy overload the armature 77 tilts and the tongue 79 pushes the tip of the bimetal off of the latch member 74 which leaves the tripping member or cradle 65 free to move to the open circuit position.

In order to bring the spacing of the latching tips down to slightly less than the width of the bimetal strip, the side pieces of the cradle are offset at 65'.

In the form shown in Fig. 21, the tripping member or cradle 85 is hinged at 86 and supports the movable switch member 87 at 88. The actuating member 89 is hinged at 90 in the housing (not shown). The spring 91 connects the actuating member with the switch member. The bimetal strip 92 is supported at 93 and its tip connected to a flexible conductor 94 which is connected to the movable switch member 87. The normal closed circuit extends from terminal 95, through bracket 96, bimetal strip 92, conductor 94, switch member 87, stationary contact 97 to terminal 98. The long arm of the tripping member or cradle 85 carries the pivot 99 of the latching member. This latching member has a lug 100 and an armature 101 adapted to coact with the magnet field piece 102. The spring 103 connects the cradle 85 with the latching member and biases the armature against the stop 104. The latch piece 105 is hinged at 106 to the housing (not shown). This piece 105 has an extension 107 which forms an abutment for the latch member 100. This piece 105 also has a toe 108 which extends adjacent the tip of the bimetal strip 92. When the bimetal strip is warped by heat to move toward the right it will withdraw the latch member 107 from the part 100 and allow the spring 91 to throw the parts to open circuit position. The spring 110 pushes the toe 108 against the bimetal strip to return it to its normal position when cooled, so that the part 107 will be brought back in proper position to receive the latching engagement of the mechanism for resetting the switch after an automatic release.

In case of a sudden heavy overload, the magnet is energized and draws the armature 101 downwardly thus moving the latch part 100 to disengage it from the latch part 107, thus permitting the cradle to move to open the circuit as in the manner previously described.

This is a partial continuation of application Serial Number 91,085 filed May 3, 1949, now Patent No. 2,573,307 issued October 30, 1951.

I claim:

1. A circuit breaker having circuit making and breaking mechanism and a housing therefor, a trip member for said mechanism biased for movement to an open circuit position, a latch member movably mounted on said trip member and movable with said trip member, a bimetal member normally engaging said latch member so as to hold said trip member against its bias in a closed circuit position, means for heating said bimetal member in response to the current in the circuit breaker so as to cause said bimetal member to move out of engagement with said latch member upon the occurrence of a light overload current thereby to release said trip member, an armature connected to said latch member, and magnetic means fixed in said housing responsive to the current in the circuit breaker for moving said armature and said latch member upon the occurrence of a heavy overload current thereby to move said latch member out of engagement with said bimetal member and release said trip member.

2. A circuit breaker having circuit making and breaking mechanism and a housing therefor, a trip member for said mechanism biased for movement to an open circuit position, a combined armature and latch member movably mounted on said trip member and movable with said trip member, a bimetal member normally engaging said latch member so as to hold said trip member against its bias in a closed circuit position, means for heating said bimetal member in response to the current in the circuit breaker so as to cause said bimetal member to move out of engagement with said latch member upon the occurrence of a light overload current thereby to release said trip member, and magnetic means fixed in said housing responsive to the current in the circuit breaker for attracting said armature upon the occurrence of a heavy overload current thereby to move said latch member out of engagement with said bimetal member and release said trip member.

3. A circuit breaker having circuit making and breaking mechanism and a housing therefor, a pivotally mounted trip arm for said mechanism biased for movement to an open circuit position, a combined armature and latch member pivotally mounted on the movable end of said trip arm and movable with said trip arm, a bimetal member normally engaging said latch member so as to hold said trip arm against its bias in a closed circuit position, means for heating said bimetal member in response to the current in the circuit breaker so as to cause said bimetal member to move out of engagement with said latch member upon the occurrence of a light overload current thereby to release said trip arm, and magnetic means fixed in said housing responsive to the current in the circuit breaker for attracting said armature upon the occurrence of a heavy overload current thereby to move said latch member out of engagement with said bimetal member and release said trip member.

4. A circuit breaker comprising a housing, a pivoted actuating member, a cradle pivotally mounted at one end, a switch arm provided with a movable switch contact pivoted on said cradle at a point intermediate its ends, a cooperating fixed switch contact, a spring connecting said actuating member and said switch member movable by said actuating member to snap said switch arm to a closed circuit position to engage said contacts and to an open circuit position to disengage said contacts, said spring applying a force to said switch member to bias said cradle for movement about its pivot to a predetermined position in which said switch arm is in an open circuit position, a latch member pivotally mounted on the movable end of said cradle, a bimetal member normally engaging said latch member thereby to hold said cradle in a predetermined normal switch operating position, means for heating said bimetal member in response to the current in said contacts so as to cause said bimetal member to move out of engagement with said latch member upon the occurrence of a light overload current thereby to release said cradle, an armature connected to said latch member, and magnetic means fixed in said housing responsive to the current in said contacts for attracting said armature to move said latch member about its pivot out of engagement with said bimetal member upon the occurrence of a heavy overload current thereby to release said cradle.

5. A circuit breaker comprising a housing, a pivoted actuating member, a cradle pivotally mounted at one end, a switch arm provided with a movable switch contact pivoted on said cradle at a point intermediate its ends, a cooperating fixed switch contact, a tension spring connecting said actuating member and said switch member movable by said actuating member to snap said switch arm to a closed circuit position to engage said contacts and to an open circuit position to disengage said contacts, said spring applying a force to said switch member to bias said cradle for movement about its pivot to a predetermined position in which said switch arm is in an open circuit position, a combined latch member and armature pivotally mounted on the movable end of said cradle, a spring for holding said latch member in a predetermined position relative to said cradle, a bimetal member normally engaging an end of said latch member thereby to hold said cradle in a predetermined normal switch operating position, means for heating said bimetal member in response to the current in said contacts so as to cause said bimetal member to move out of engagement with said latch member upon the occurrence of a light overload current thereby to release said cradle, and magnetic means fixed in said housing responsive to the current in said contacts for attracting said armature to move said latch member about its pivot out of engagement with said bimetal member upon the occurrence of a heavy overload current thereby to release said cradle.

ROBERT T. CASEY.

References Cited in the file of this patent

UNITED STATES PATENTS

| Number | Name | Date |
|---|---|---|
| 2,210,259 | Sachs | Aug. 6, 1940 |
| 2,370,024 | Dyer | Feb. 20, 1945 |